US006498959B1

(12) United States Patent
January et al.

(10) Patent No.: US 6,498,959 B1
(45) Date of Patent: Dec. 24, 2002

(54) APPARATUS AND METHOD FOR CONTROLLING A MECHANISM FOR POSITIONING VIDEO CAMERAS FOR USE IN MEASURING VEHICLE WHEEL ALIGNMENT

(75) Inventors: Daniel B. January, County of St. Charles, MO (US); Nicholas J. Colarelli, III, County of St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 09/487,563

(22) Filed: Jan. 19, 2000

(51) Int. Cl.$^7$ .............................................. G05B 19/18
(52) U.S. Cl. ............................ 700/56; 700/57; 700/58; 700/59; 700/61; 700/64; 700/279; 701/41; 701/42; 701/43; 701/44; 33/286; 33/288; 33/227; 356/138; 356/139.01; 356/139.04; 356/139.06; 356/139.09; 356/153
(58) Field of Search ............................. 700/56, 57, 58, 700/59, 61, 62, 64, 65, 66, 279; 701/41–44; 33/286, 288, 227; 356/138, 139.01, 139.03, 139.04, 139.06, 139.09, 139.1, 153

(56) References Cited

U.S. PATENT DOCUMENTS

| 5,488,472 | A | * | 1/1996 | January ........................ 33/288 |
| 5,489,983 | A | * | 2/1996 | McClenahan et al. .. 250/214 B |
| 5,519,489 | A | * | 5/1996 | McClenahan et al. ... 33/203.15 |
| 5,535,522 | A | | 7/1996 | Jackson ........................ 33/288 |
| 5,598,358 | A | * | 1/1997 | Gender et al. ........... 33/203.18 |
| 5,675,515 | A | | 10/1997 | January ...................... 700/279 |
| 5,724,128 | A | | 3/1998 | January .................. 356/739.09 |
| 5,724,743 | A | | 3/1998 | Jackson ........................ 33/288 |
| 5,809,658 | A | | 9/1998 | Jackson et al. ................ 33/288 |
| 5,870,315 | A | | 2/1999 | January ....................... 700/279 |
| 5,943,783 | A | | 8/1999 | Jackson ........................ 33/288 |
| 6,064,750 | A | * | 5/2000 | January et al. ........... 33/203.18 |
| 6,209,209 | B1 | * | 4/2001 | Linson et al. .................. 33/203 |
| 6,219,134 | B1 | * | 4/2001 | Voeller et al. ........... 33/203.12 |
| 6,298,284 | B1 | * | 10/2001 | Burns et al. ................. 356/139 |
| 6,323,776 | B1 | * | 11/2001 | Jackson et al. .............. 340/679 |

FOREIGN PATENT DOCUMENTS

WO  WO 9903018  7/1998

* cited by examiner

Primary Examiner—Ramesh Patel
(74) Attorney, Agent, or Firm—Polster, Lieder, Woodruff & Lucchesi

(57) ABSTRACT

An apparatus and method for controlling a mechanism for positioning video cameras for use in measuring vehicle wheel alignment includes optical targets for mounting to the wheels of a vehicle, at least one video camera for viewing said optical targets and producing at least one image thereof, a computer system for measuring said at least one image and for using said measurements to compute vehicle wheel alignment information, a positioning system for positioning said at least one video camera such that said optical targets are visible to said at least one video camera and such that said at least one video camera can produce said at least one image of said targets, and a controller for controlling said positioning system such that a user of said apparatus can cause said at least one video camera to be positioned in at least one desired position and such that said user can further cause said controller to remember said at least one desired position so that any user can, at a later time, cause said controller to recall said remembered position and move said at least one video camera to said remembered position.

12 Claims, 10 Drawing Sheets

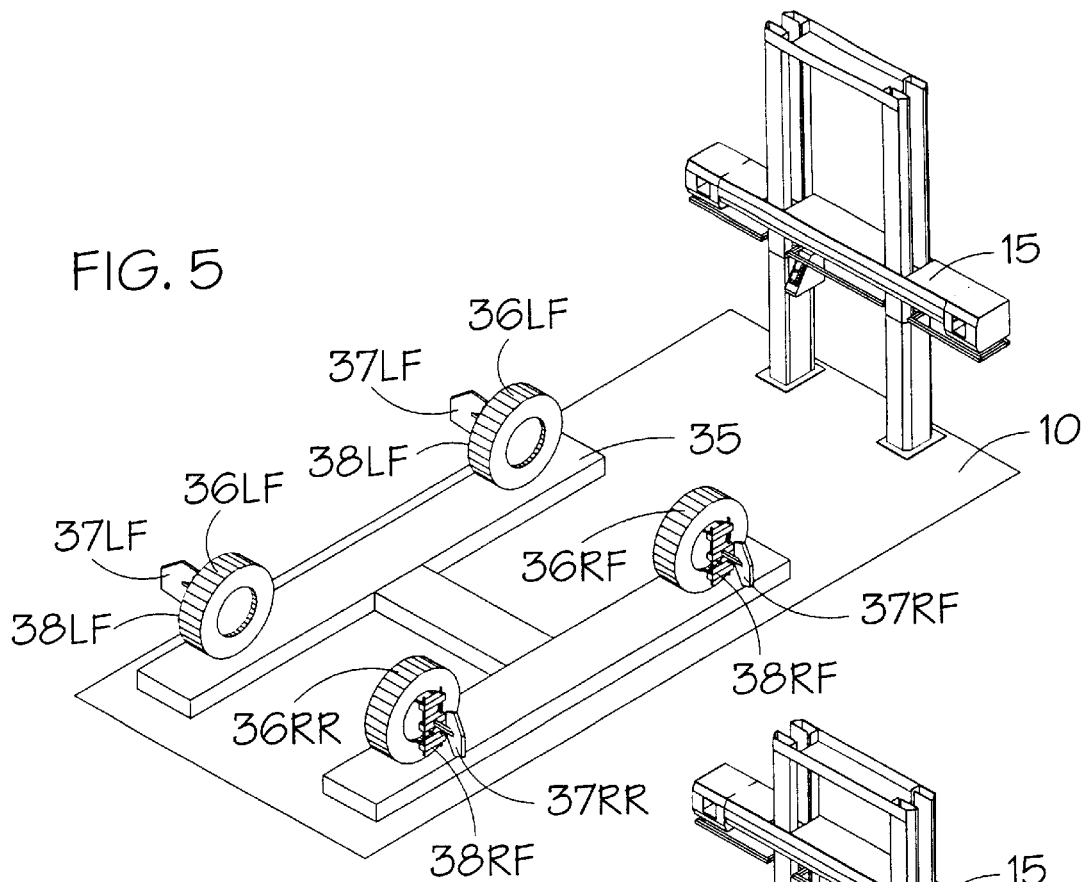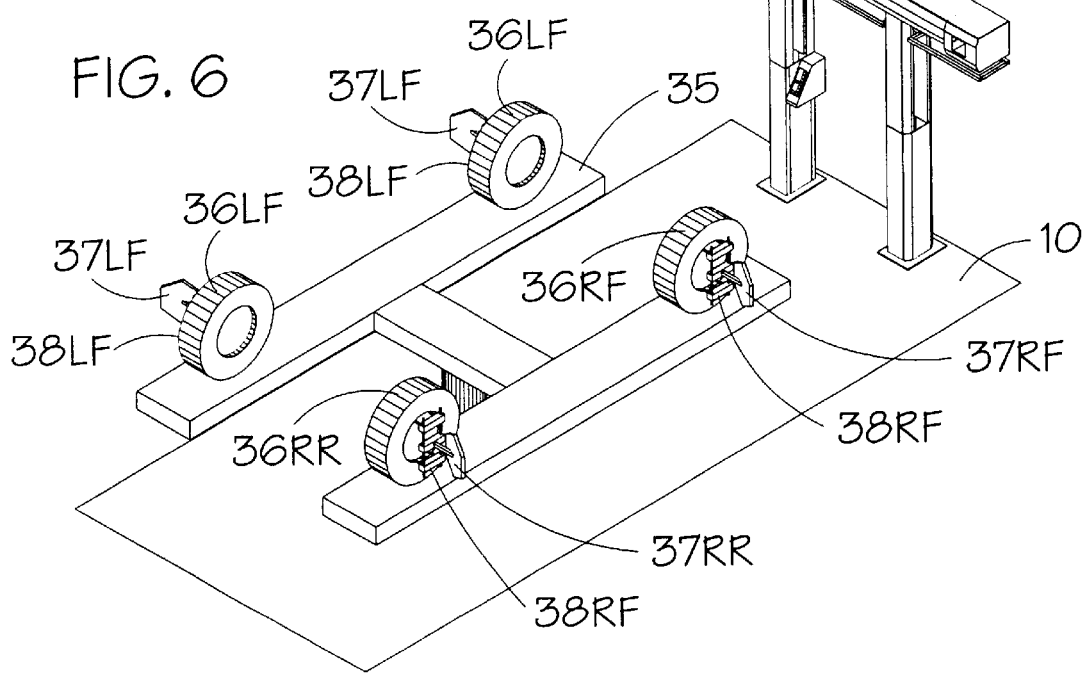

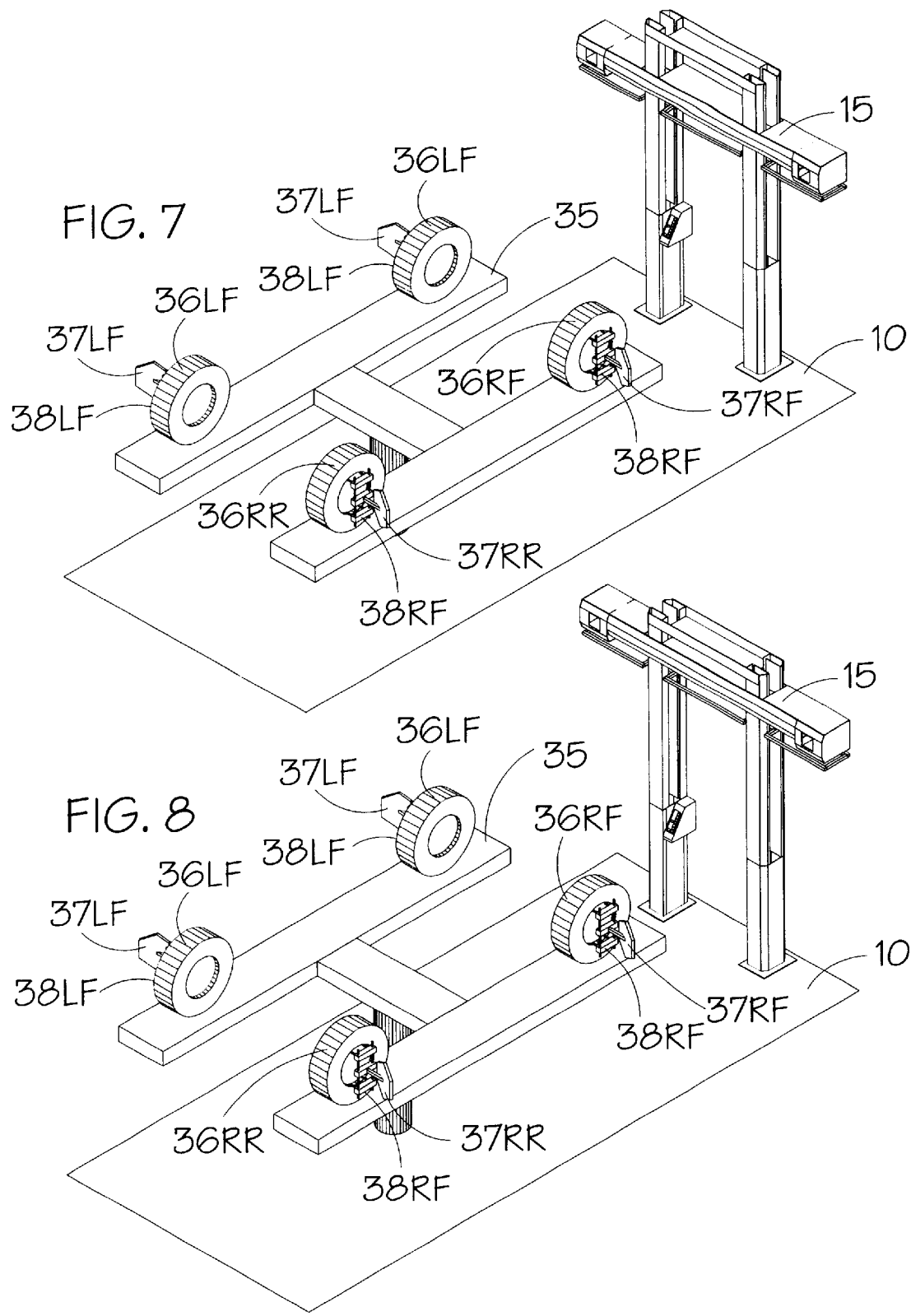

APPARATUS AND METHOD FOR CONTROLLING A MECHANISM FOR POSITIONING VIDEO CAMERAS FOR USE IN MEASURING VEHICLE WHEEL ALIGNMENT

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates to vehicle wheel alignment, and more particularly to vehicle wheel alignment systems which embody movable video cameras and wheel mounted optical targets.

Two such vehicle wheel alignment systems are presently available in the marketplace. One, sold by Hunter Engineering Company and labeled as the DSP-400™, is generally described by U.S. Pat. Nos. 5,675,515, 5,870,315, 5,724, 128, and 6,064,750. The other vehicle wheel alignment system, sold by Industrial Diagnostics Selling Co. (IDSC) under the trade name John Bean, and labeled as the Visualiner 3D™, is generally described by U.S. Pat Nos. 5,535, 522, 5,724,743, 5,809,658, and 5,943,783.

These systems operate by using video cameras to generate video images of optical targets which are mounted to the wheels of a vehicle. These video images may be in either analog or digital format. Computers are then used to measure the generated images and relate the measurements obtained thereby to corresponding known information about the optical targets. This allows the positions and orientations of the optical targets to be computed, from which the alignment angles of the wheels of the vehicle are computed.

The design of such a system involves tradeoffs, as does the design of any wheel alignment system. One such tradeoff is between focal length and vertical movement of the vehicle lift rack. It is desirable to make the focal lengths of the cameras short enough that the wheel mounted optical targets are in the fields of view of the cameras when the vehicle lift rack is raised to allow the technician to work under the vehicle. In general, the desired working height of the lift rack can be anywhere from "all the way down" to "all the way up", which is a range of some six feet or so in height. If the focal lengths of the cameras are made short enough to accomplish this, the targets appear so small in the image that measurement of the image becomes difficult and inaccurate, if not actually impossible. The tradeoff is to make the focal length as long as is necessary for the required accuracy and accept the limited range of movement for the vehicle lift rack which this imposes. The result is that measurements of the vehicle wheel alignment can be made only with the vehicle lift rack in a smaller range of vertical positions such that the cameras can view the targets and measure the images produced, and this range of vertical positions is generally smaller than desired. The system must be very accurate to be of commercial use, and achieving the required accuracy is quite difficult, therefore achieving the required accuracy wins the tradeoff and the vehicle wheel alignment can be measured with the vehicle lift rack in only a limited range of vertical positions.

This can be made easier by using a video camera design which embodies CCD detectors having a larger number of pixels. For example, instead of using a CCD detector having pixels in a 640×480 format, one could use a 2000×1000 format. Unfortunately, such CCD detectors are currently much too expensive for use in such a system. Further, using such a design places extreme demands on the quality of the lenses used by the video cameras, thereby further increasing their costs. Such a solution, while possible, is not currently economically practical.

One solution to this problem is to mount the cameras to a mechanism which pivots so as to allow the cameras to point more downward when the vehicle lift rack is in a lower position, and more upward when the vehicle lift rack is in a higher position. While possible, this is not very practical due to the wide range of sizes of vehicles which such a system must be capable of measuring, and due to the wide range of orientations of the targets relative to the cameras.

A practical solution to this problem is to design the system such that the cameras can be raised up or down to match the corresponding change in height of the vehicle lift rack. Such a system is described in U.S. Pat. Nos. 5,675,515 and 5,870,315, the full disclosures of which are incorporated herein by reference.

The Visualiner 3D™, as sold by IDSC, optionally embodies such a design. In the Visualiner 3D™ version, a vertical post is mounted to the floor. A horizontal beam is mounted to a traveler which is free to move vertically along this vertical post. The video cameras are mounted to the ends of the horizontal beam such that they are aimed generally down the sides of the vehicle and can see the targets mounted to the vehicle wheels. A counterweight inside the vertical post is connected by cables to the traveler such that the traveler and horizontal beam can be raised or lowered to any desired position, thereby allowing the cameras to be positioned to work with any height of the vehicle lift rack.

In the Visualiner 3D™ version, a conventional chain-and-cable type garage door opener is used to provide the motive force to move the horizontal beam and control its position. The garage door opener is mounted with the motor above the vertical post and the boom of the opener textending down inside it. The traveler of the garage door opener is connected by a cable to the traveler of the horizontal beam, such that the garage door opener provides both the motive force to move the cameras up or down and the operating controls to allow the technician to move the cameras and stop at a desired position.

This garage door opener operates exactly as it would if it were connected to a garage door. If the alignment technician presses and releases the control pushbutton, the cameras move up or down, whichever is the opposite of the direction they last moved. If then left alone, the cameras move until a built in limit switch trips, at which point the cameras stop moving. If the technician presses the pushbutton while the cameras are moving, the response depends on the direction of movement—if the movement is up, the cameras stop moving; if the movement is down, the cameras reverse direction and move up, exactly as would a garage door. This means that the technician can stop the cameras at a desired position only when the cameras are moving up, unless the desired position is where a limit switch stops the movement.

While functional, the Visualiner 3D™ camera lift mechanism is clumsy to use. The technician is able to stop the cameras at a desired vertical position only when the cameras are moving up. If the cameras are moving down, pressing the pushbutton causes them to reverse direction and move up.

This can make small adjustments in the camera position difficult and clumsy to accomplish. The lift mechanism moves the cameras up or down rather quickly, which some might call an advantage, but it makes stopping the cameras at a precise location very difficult, as there is a noticeable lag between the pushing the pushbutton and the cameras stopping. A remote control is available (a conventional garage door remote control), but using it is even more difficult, as there is about a one second lag in time between when the button is pushed and the motor responds, which is longer than with the conventional pushbutton.

There exists a clear need for apparatus and methods which allow easy and simple control of a camera positioning system to move the cameras to a desired position.

BRIEF SUMMARY OF THE INVENTION

Among the various objects and features of the present invention may be noted the provision of improved apparatus and method for controlling the position of video cameras in a wheel alignment system embodying a camera positioning system.

Briefly, the apparatus of the present invention includes optical targets for mounting to the wheels of a vehicle, at least one video camera for viewing said optical targets and producing at least one image thereof, and a computer system for measuring said at least one image and for using the measurements to compute vehicle wheel alignment information. A positioning system is included for positioning the at least one video camera such that the optical targets are visible to the at least one video camera and such that it can produce the image of said targets. A controller is further included for controlling the positioning system such that a user of said apparatus can cause the at least one video camera to be positioned in at least one desired position. The controller is further configured such that the user can direct the controller to store or "remember" the at least one desired position, and such that any user can, at a later time, direct the controller to recall the stored position and move the at least one video camera to the stored position.

Briefly, the method of the present invention for controlling camera position in a wheel alignment system having optical targets mounted to the wheels of a vehicle, at least one video camera configured for viewing said optical targets and producing at least one image thereof, a computer system configured for measuring said at least one image and for using said measurements to compute vehicle wheel alignment information, and a positioning system configured for positioning said at least one video camera such that said at least one video camera can produce said at least one image of said targets is described. The method comprises the steps of positioning the at least one video camera in at least one desired position, and storing the at least one desired position in a controller such that a user can, at a later time, cause said controller to recall said stored position and cause the positioning system to position the at least one video camera at the stored position.

Briefly, a further method of the present invention is that in response to a desired position being identified by a user, the camera positioning system be controlled to cause the at least one video camera to move to the identified position.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 5 is an isometric view showing the vehicle lift rack in its lowest position, or "all the way down", with the camera positioning system positioning the cameras at an appropriate height so the cameras can see the wheel mounted optical targets;

FIG. 6 is an isometric view showing the vehicle lift rack raised to what is commonly known as "alignment height", with the camera positioning system positioning the cameras at an appropriate height so the cameras can see the wheel mounted optical targets;

FIG. 7 is an isometric view showing the vehicle lift rack raised to what is commonly known as "adjustment height", with the camera positioning system positioning the cameras at an appropriate height so the cameras can see the wheel mounted optical targets;

FIG. 8 is an isometric view showing the vehicle lift rack in its highest position, or "all the way up", with the camera positioning system positioning the cameras at an appropriate height so the cameras can see the wheel mounted optical targets;

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believe to be the best mode of carrying out the invention.

It is preferred that the present invention be embodied as a part of a vehicle wheel alignment system of the general type described above as the Hunter DSP-400, which uses video cameras to generate video images of optical targets which are mounted to the wheels of a vehicle. Such a system would generally have one or more video cameras mounted at each side of a mounting structure which is constructed so as to allow the cameras to view the wheel mounted targets. Most importantly, the system would allow the cameras to move up and down so that, if the vehicle lift is moved up or down, the cameras would still be able to view the wheel mounted targets and measure the video images generated thereof. Such a system, while a preferred embodiment, is only one form of a camera positioning system. The present invention is concerned with the apparatus and methods by which a camera positioning system is controlled.

Figure 1:
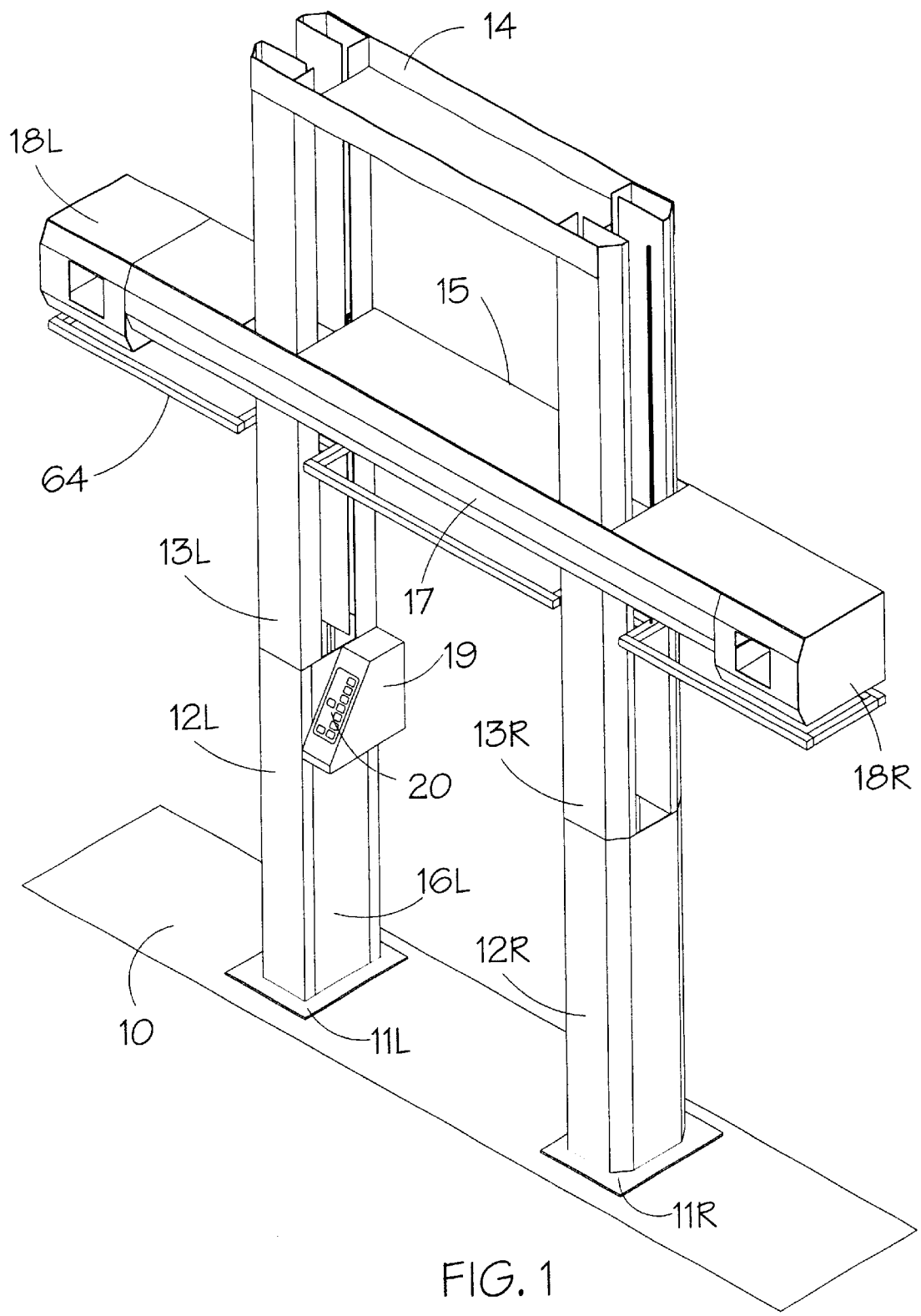
FIG. 1 is an isometric view showing the camera positioning system from the upper right.

FIG. 1 shows an isometric view of a camera positioning system of the preferred embodiment. This structure would normally be mounted to the floor 10 by bolts through the base plates 11L and 11R and would reside in front of a vehicle lift rack, as is shown in FIGS. 5 through 8. The mounting of cameras for the purpose of viewing wheel mounted targets is now well known to those of ordinary skill in the art.

In general, two vertical columns are used to hold a horizontal beam assembly. The left column consists of the lower section 12L and upper section 13L while the right column similarly consists of the lower section 12R and upper section 13R. A cross brace 14 connects the tops of the two upper sections 13L and 13R such that the two columns form a rigid structure. A horizontal beam assembly, collectively labeled 15, can be moved in a vertical manner such that its highest position is near the top of the upper sections 13L and 13R and its lowest position is near the bottom of the upper sections 13L and 13R, as illustrated in FIGS. 5 through 8. The lower sections 12L and 12R, which are hollow, have inner covers 16L and 16R (which is hidden behind the lower section 12R in FIG. 1), respectively, which allow access to their insides. The horizontal beam 15 has an outer cover 17 and, at its ends, a left camera cover 18L and a right camera cover 18R. As will be shown presently, these camera covers protect the cameras 24L and 24R, which are mounted inside the horizontal beam assembly 15. A control box 19 houses a controller (see FIG. 11) and presents a membrane type keypad 20 to allow the technician to control the vertical position of the horizontal beam 15 and thus the position of the cameras 24L and 24R. The internal structures of this entire mechanism are shown in subsequent figures by either removing these covers and other parts or by showing them as "transparent".

Figure 2:
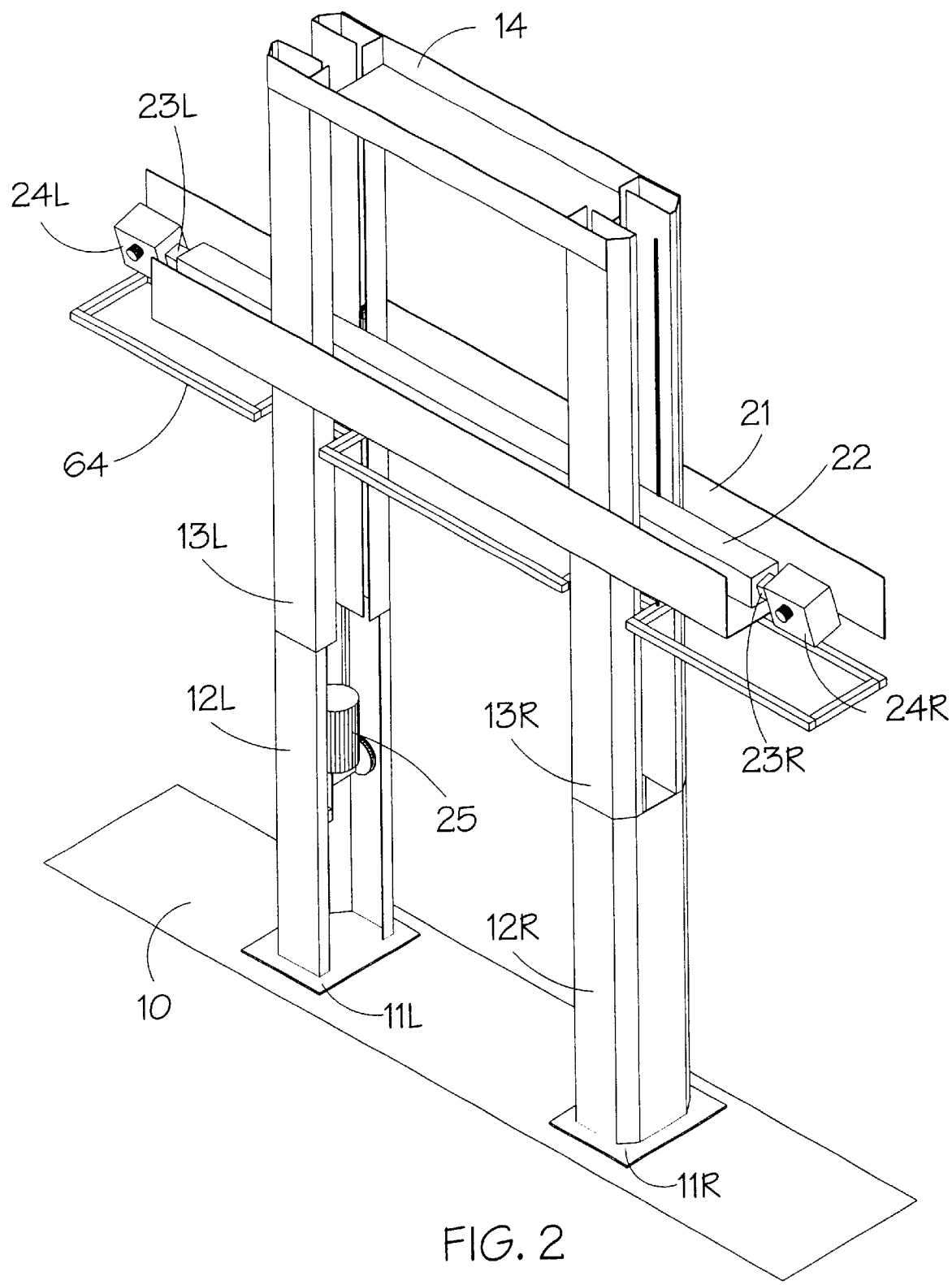
FIG. 2 is an isometric view showing the camera positioning system from the upper right, with some parts removed for clarity.
Figure 3:
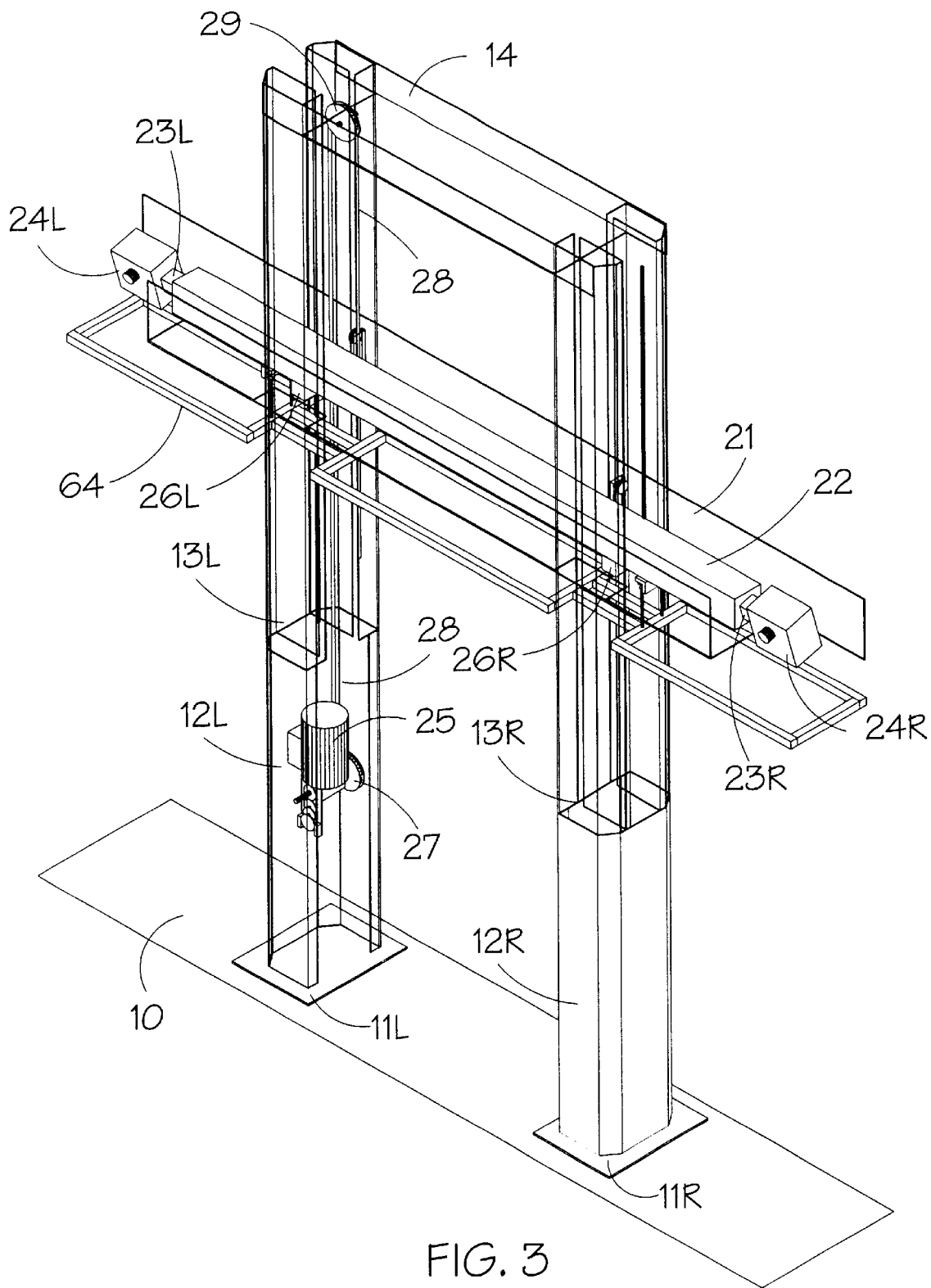
FIG. 3 is an isometric view showing the camera positioning system from the upper right, with some parts removed and other parts made transparent for clarity.
Figure 4:
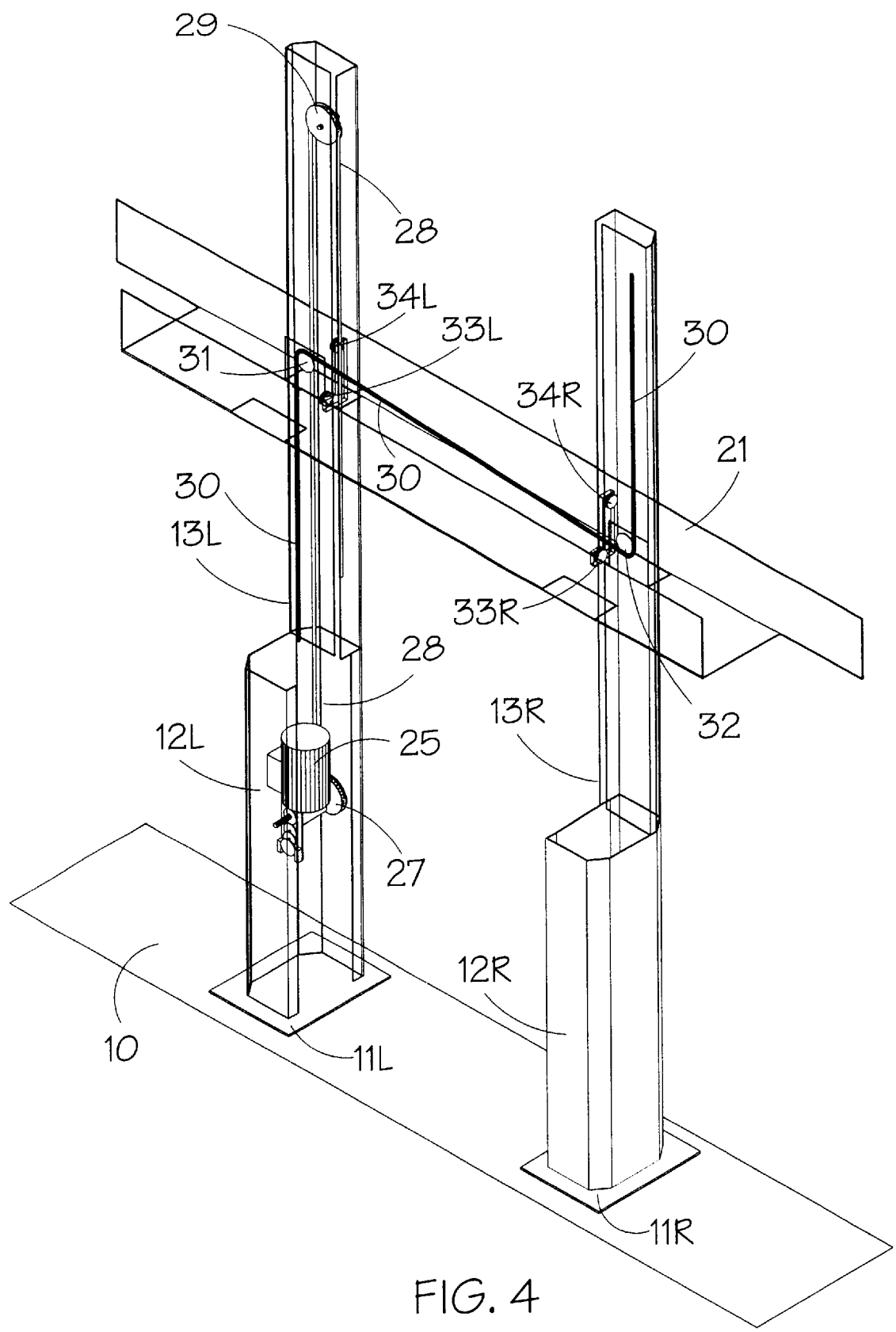
FIG. 4 is an isometric view showing the camera positioning system from the upper right, with some parts removed and other parts made transparent for clarity.

FIG. 2 is similar to FIG. 1 with the inner cover 16L, horizontal beam outer cover 17, camera covers 18L and 18R, and control box 19 removed to reveal some of the inner structure. The main shell 21 of the horizontal beam assembly 15 is able to move vertically along and through the upper sections 13L and 13R by means of rollers (as shown in FIG. 4). The main shell 21 carries a hollow steel beam 22, which rests on simple supports (as shown in FIG. 3), such that no twisting or other distorting forces are imposed on the beam 22. Left and right cameras 24L and 24R are mounted by mounts 23L and 23R, respectively, to the ends of beam 22, which thereby maintains a constant relationship between the cameras 24L and 24R after they are properly aimed. The mounts 23L and 23R allow the cameras to be "aimed" horizontally and vertically so they are properly located on the beam 22. A motor assembly 25 provides the motive force to raise and lower the horizontal beam assembly 15, through a mechanism which will be illustrated presently.

It is important to note that the present invention is not concerned with how many video cameras are used. The Hunter DSP-400™ currently uses four video cameras, two on each side, such that each camera is used to view one target. The Visualiner 3D ™ currently uses two video cameras, one on each side, such that each camera is used to view two targets simultaneously. In the disclosure of U.S. Pat. No. 5,535,522, only a single camera is disclosed. In this disclosure, the camera 24L generically means "the camera or cameras mounted and positioned so as to see targets mounted to the left wheels of the vehicle", while the camera 24R generically means "the camera or cameras mounted and positioned so as to see targets mounted to the right wheels of the vehicle". In general, the cameras are used to generate images of the wheel mounted targets, the purpose of the camera positioning mechanism is to position the cameras so they can view the targets, and the purpose of the controller is to control the positioning of the cameras. In such a system, the cameras are deemed to be in their proper positions when they are able to the view the wheel mounted targets and form images thereof which are suitable for determining the alignment of the wheels.

FIG. 3 is similar to FIG. 2 with the lower section 12L, upper sections 13L and 13R, cross brace 14, and main shell 21 shown transparently. Here it can be plainly seen how the hollow steel beam 22 passes through the upper sections 13L and 13R and rests on its supports 26L and 26R. A pulley 27 is mounted to the output shaft of the motor assembly 25 such that a spring steel tape 28 wraps around it and passes upward to a pulley 29, which is mounted to the upper end of the upper section 13L, and further passes down to where it attaches to the main shell 21 behind the beam 22. As the motor shaft spins, the pulley 27 spins and takes up the tape 28, which thereby raises the entire horizontal beam assembly 15. If the motor shaft spins the opposite direction, the tape 28 plays out and the horizontal beam assembly 15 lowers.

FIG. 4 is similar to FIG. 3 with the front halves of the upper sections 13L and 13R removed, along with the cross brace 14, beam 22, cameras 24L and 24R, and safety bar 64. A steel cable 30 is attached at its lower end to the lower section 12L. It passes up and over the pulley 31, which is mounted to the main shell 21, and then passes to the right and under the pulley 32, which is also mounted to the main shell 21, and finally passes up to its upper attachment point on the upper section 13R. As the steel tape 28 raises or lowers the beam 15, the system of cable 30 and pulleys 31 and 32 act to keep the beam 15 horizontal. It can be further seen in FIG. 4 that the rollers 33R and 34R are mounted to the main shell 21 such that the roller 33R rides along a front face of the back half of the upper section 13R while the roller 34R rides along a back face of the back half of the upper section 13R. The rollers 33L and 34L are mounted in a similar manner and ride along the back half of the upper section 13L. The weight of the entire horizontal beam assembly 15 is supported by the steel tape 28 and cantilevered by the rollers 33L, 34L, 33R, and 34R, thereby holding the rollers firmly against the upper sections 13L and 13R. These rollers act to allow the beam 15 to move along upper sections 13L and 13R with low friction and good stability.

FIGS. 1 through 4 thus clearly illustrate the internal structure of a camera positioning system of the preferred embodiment. While FIGS. 1–4 illustrate one such mechanism, it is readily apparent to one skilled in the art that many such designs are suitable. For example, the elevating operation could be accomplished by one or more hydraulic or air cylinders, or by jackscrews, or by winches, or by a rack and pinion gear system, or even by a ratcheting mechanism. The present invention is not concerned with how the motive force is generated to move the camera mount up or down, as the prior art in U.S. Pat. No. 5,870,315 clearly discloses that many such mechanisms are possible, rather it is concerned with the apparatus and method by which control is exercised over the mechanism. Indeed, as noted above, a suitable camera positioning system need not move the cameras up or down at all, but could operate by mounting the cameras to a bar which is allowed to pivot about an axis, with the control system described herein controlling that pivoting. The present invention is not limited to any particular mechanism for positioning the cameras, and can be used with any such mechanism - rather the present invention is concerned with how control is exercised by the user over such a mechanism.

FIG. 5 shows an isometric view of the camera positioning mechanism in front of a vehicle which is parked on a vehicle lift rack 35. For visual clarity, the vehicle is not shown explicitly, rather only the four wheels and tires 36LF, 36RF, 36LR, and 36RR of the vehicle are shown. This is quite sufficient, as parking a vehicle on a vehicle lift rack for the purpose of measuring its wheel alignment is well known in the art. On the left front wheel 36LF, the optical target 37LF is mounted via a wheel clamp 38LF (not visible behind the wheel in this view). On the right front wheel 36RF, the optical target 37RF is mounted via a wheel clamp 38RF. On the left rear wheel 36LR, the optical target 37LR is mounted via a wheel clamp 38LR (not visible behind the wheel in this view). On the right front wheel 36RR, the optical target 37RR is mounted via a wheel clamp 38RR.

In FIG. 5, the vehicle lift rack 35 is shown in its lowest position, or "all the way down". For most vehicle lift racks, this is a height about six inches to a foot above the floor 10. The horizontal beam 15, in which the cameras 24L and 24R are mounted as shown in FIG. 2 and FIG. 3, is in a low position so the cameras 24L and 24R can see the targets properly.

FIG. 6 is similar to FIG. 5 with the vehicle lift rack 35 raised to what is commonly known as "alignment height", which is usually about 30 inches above the floor. This is a comfortable working height for mounting the targets to the wheels, compensating the targets to measure the relationship between the targets and the axes of rotation of the wheels to which the targets are mounted, and performing most measurement and adjustment procedures. The horizontal beam 15 with the cameras 24L and 24R are shown moved upwards so the cameras can still see the targets properly.

FIG. 7 is similar to FIG. 6 with the vehicle lift rack 35 raised even more to what is commonly known as "adjustment height", which is above the floor sufficient for the technician to stand up under the vehicle. This is a comfortable working height for making adjustments to the underside of the vehicle, such as the toe angles of the front wheels. The horizontal beam 15 with the cameras 24L and 24R are shown moved upwards still more so the cameras can still see the targets properly.

FIG. 8 is similar to FIG. 7 with the vehicle lift rack 35 in its highest position, or "all the way up". For most vehicle lift racks, this is some six feet or so above the floor 10. This is also a comfortable working height for making adjustments to the underside of the vehicle, but it is generally used only by taller technicians. The horizontal beam 15 with the cameras 24L and 24R are shown moved upwards still more so the cameras can still see the targets properly.

What is not shown in FIG. 5 through FIG. 8 is the usual wheel alignment console, as this is quite well known in the art. The cameras 24L and 24R are connected to a conventional alignment console, usually by electrical cables. The cameras 24L and 24R and the console together comprise a computer system embodying one or more computer processors for analyzing the images produced by the cameras, computing the alignment of the wheels therefrom, and displaying the results on a display suitable for use by the alignment technician. If necessary, the camera controller 60 (see FIG. 11) could be connected to the alignment console, and control of the controller by the user could be accomplished directly at the alignment console through its keyboard, display, and/or mouse.

Figure 9A:
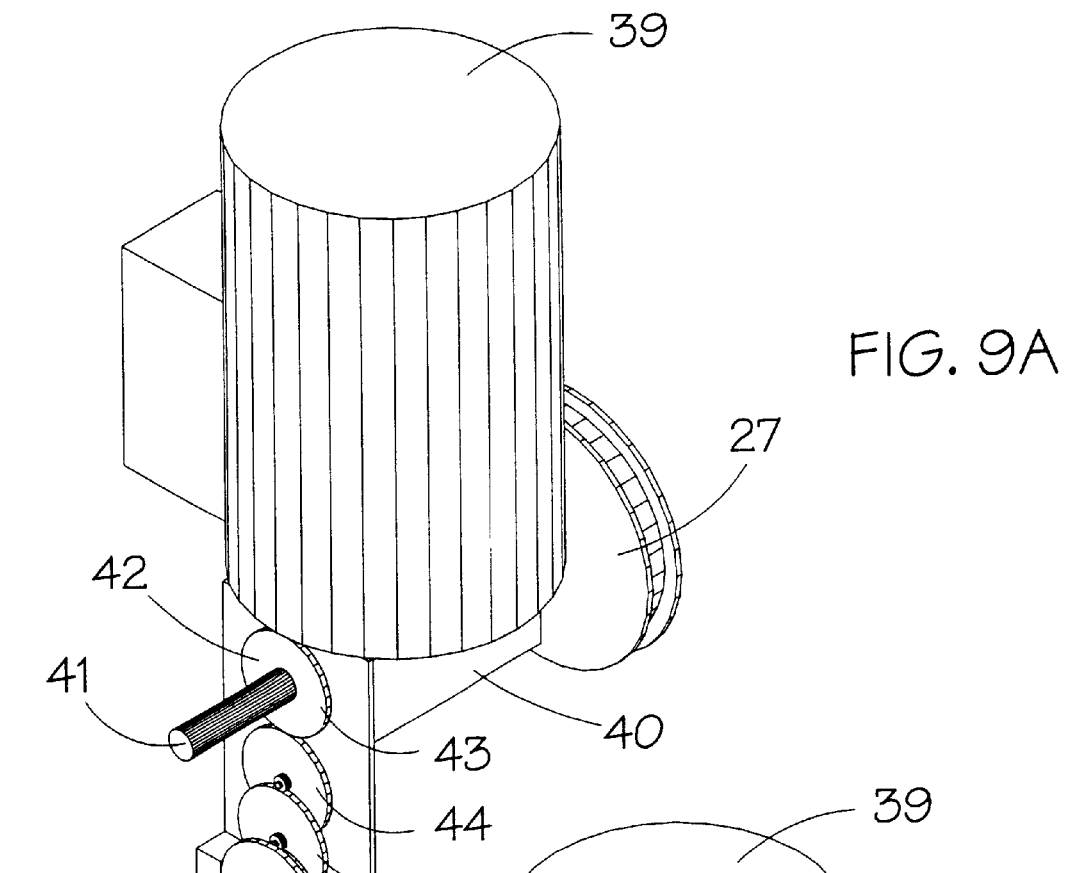
FIGS. 9A and 9B are isometric views of the motor assembly which moves the camera positioning system.
Figure 9B:
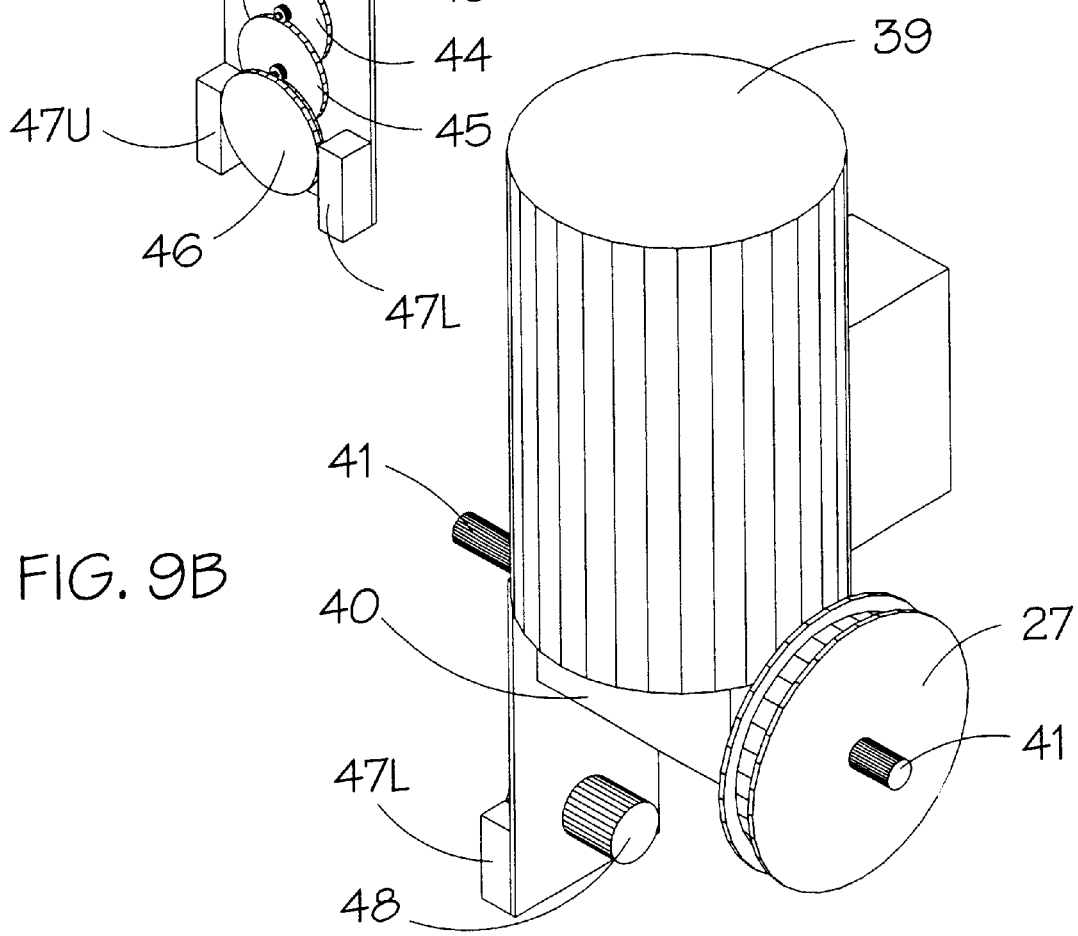

FIGS. 9A and 9B are isometric views showing the motor assembly 25 from two different directions. A reduction gearbox 40 is mounted to the end of motor 39 and provides a horizontal shaft 41. The pulley 27 is mounted to one end of the shaft 41 and acts to wind up or unwind the spring steel tape 28, as discussed previously regarding FIG. 3. On the other end of the shaft 41, a series of reduction spur gears 42, 43, 44, and 45 are used to drive a cam 46 and a potentiometer 48, both of which turn only a portion of a revolution as the horizontal beam 15 moves from all the way down to all the way up. The cam 46 actuates a lower limit switch 47L and an upper limit switch 47U such that the upper limit switch 47U is tripped when horizontal beam 15 moves to its highest desired position and the lower limit switch 47L trips when horizontal beam 15 moves to its lowest desired position. The potentiometer 48 provides a voltage which is directly related to the vertical position of the horizontal beam 15. Collectively, the potentiometer 48, upper limit switch 47U, and lower limit switch 47L provide the sensory inputs necessary for the control system of the present invention to allow the technician to cause the horizontal beam 15 to move to any desired position and, as will presently be discussed in greater detail, to return the horizontal beam 15, and thus the cameras 24L and 24R, to any desired "preset" position. It is readily apparent that most any sensory device could be used in place of potentiometer 48, for example a shaft encoder, an LVDT, a Hall effect device, or the like. For safety, a further input is provided by a safety bar 64 and safety switches 63L and 63R, as will be discussed presently.

Figure 10:
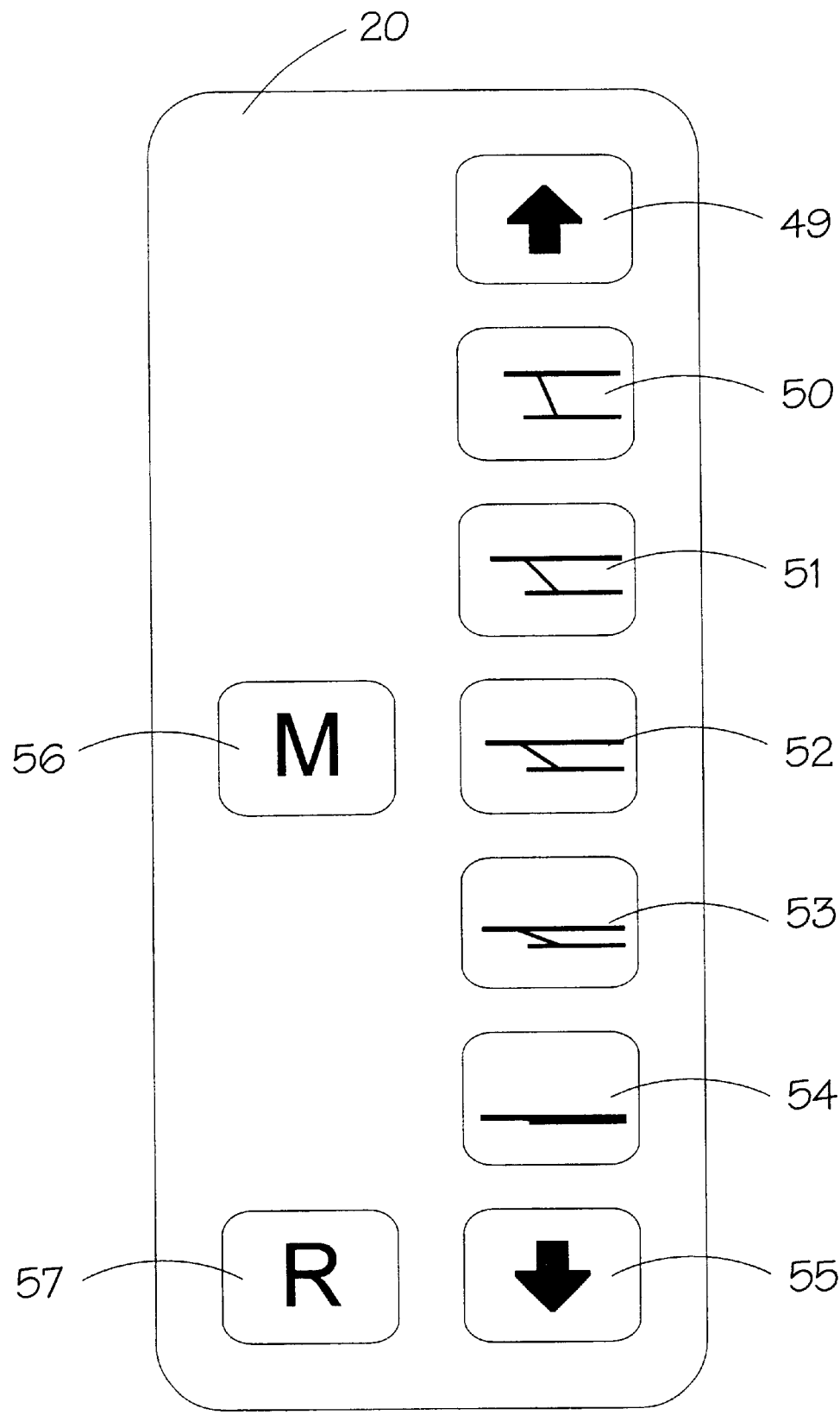
FIG. 10 shows the keypad used by the technician to control the camera positioning system.

FIG. 10 shows the keypad 20 which is used by the technician to control the positioning of the cameras. This keypad 20 is preferably of conventional membrane type construction and provides nine input keys to the control system. The operation of the camera positioning system using this keypad 20 will be discussed in detail presently. One of ordinary skill in the art will recognize that the keypad 20 need not be limited to the construction described above, but rather, may be replaced by various known input means, for example, a slide potentiometer, rotary potentiometer, or the like could be used at the control box 19 to directly indicate the desired position of the cameras. Also, equivalent graphical representation of the input keys or a sliding bar corresponding to the range of movement of the cameras may be displayed on the alignment console, in which case the graphical representation of the keys or sliding bar could be selected via a touch screen, light pen, mouse or other suitable input device. In such alternate embodiments, a suitable communications interface between the alignment console and the control system may be employed to transfer signals corresponding to the selection of the various input keys or sliding bar.

Figure 11:
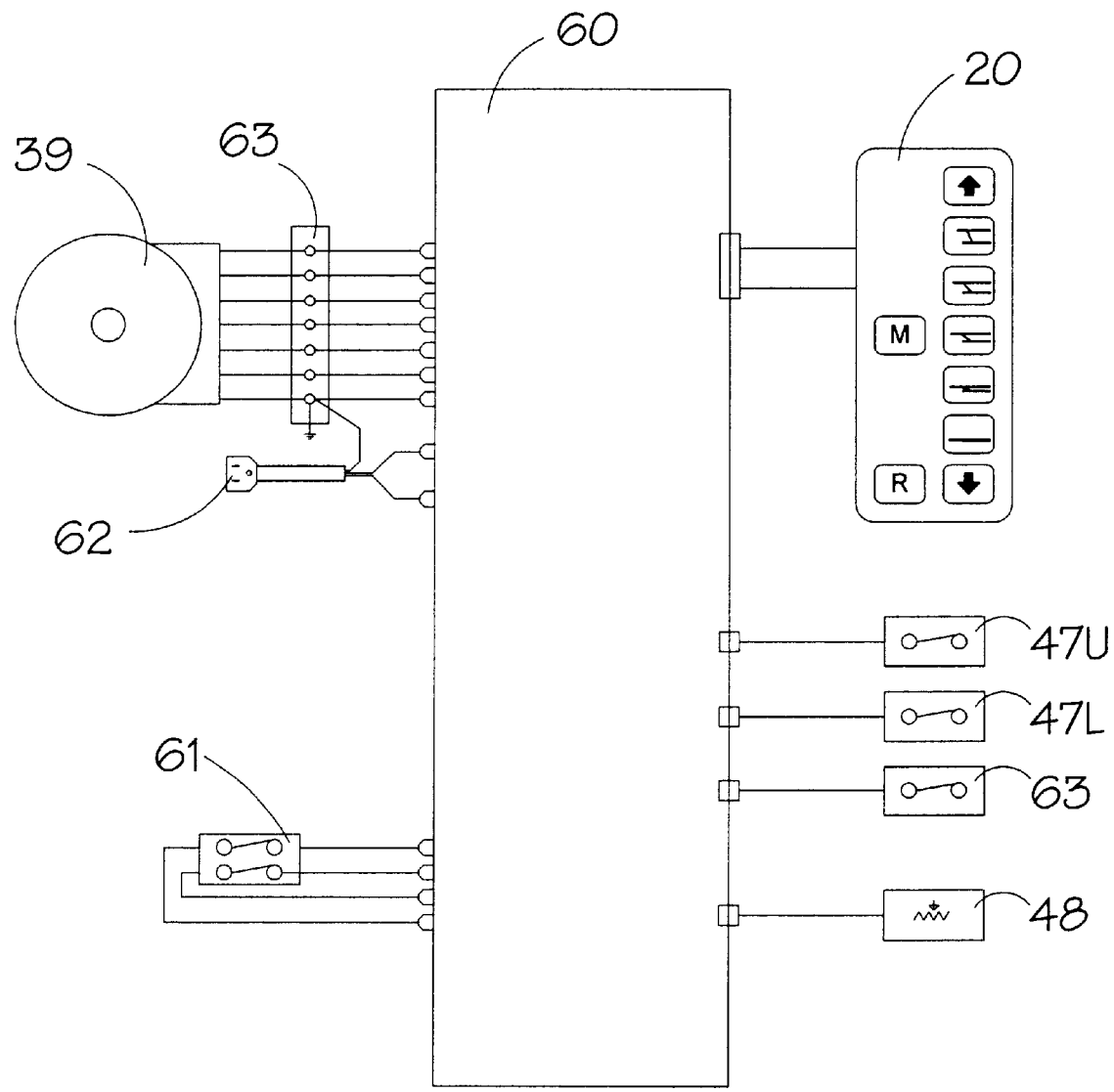
FIG. 11 shows a block diagram of the control system which controls the camera positioning system.

FIG. 11 shows a block diagram of the control system that resides in the control box 19. The controller 16 is of conventional design, incorporating an 8-bit micro-controller. The design of such a micro-controller is a simple and routine task for a person of ordinary skill in the art, provided the operation intended for the controller is known. The present invention is concerned with that operation, which will be explained in detail presently.

The micro-controller 60 incorporates two relays (not shown) to control the motor 39, which is wired to a terminal block 68, which is itself wired to the controller 60. This allows a convenient connection of the wiring of the motor 60 and allows motors of many different wiring schemes to be used. In general, one relay is used to connect the line voltage, as provided by the power cord 62, to the motor 39, and the other relay is used to control the direction of the motor. Most any capacitor-start AC induction motor can be used with such a mechanism, and providing this type of motor control is well known in the art. The keypad 20 is connected to the controller 60, as are the upper limit switch 47U, lower limit switch 47L, potentiometer 48, and safety switches 63L and 63R, collectively labeled 63 in this view. The potentiometer voltage is measured by a conventional analog-to-digital converter such that the micro-controller is able to measure the position of the horizontal beam 15 thereby. A power switch 61 allows the system to be turned on or off.

Figure 12:
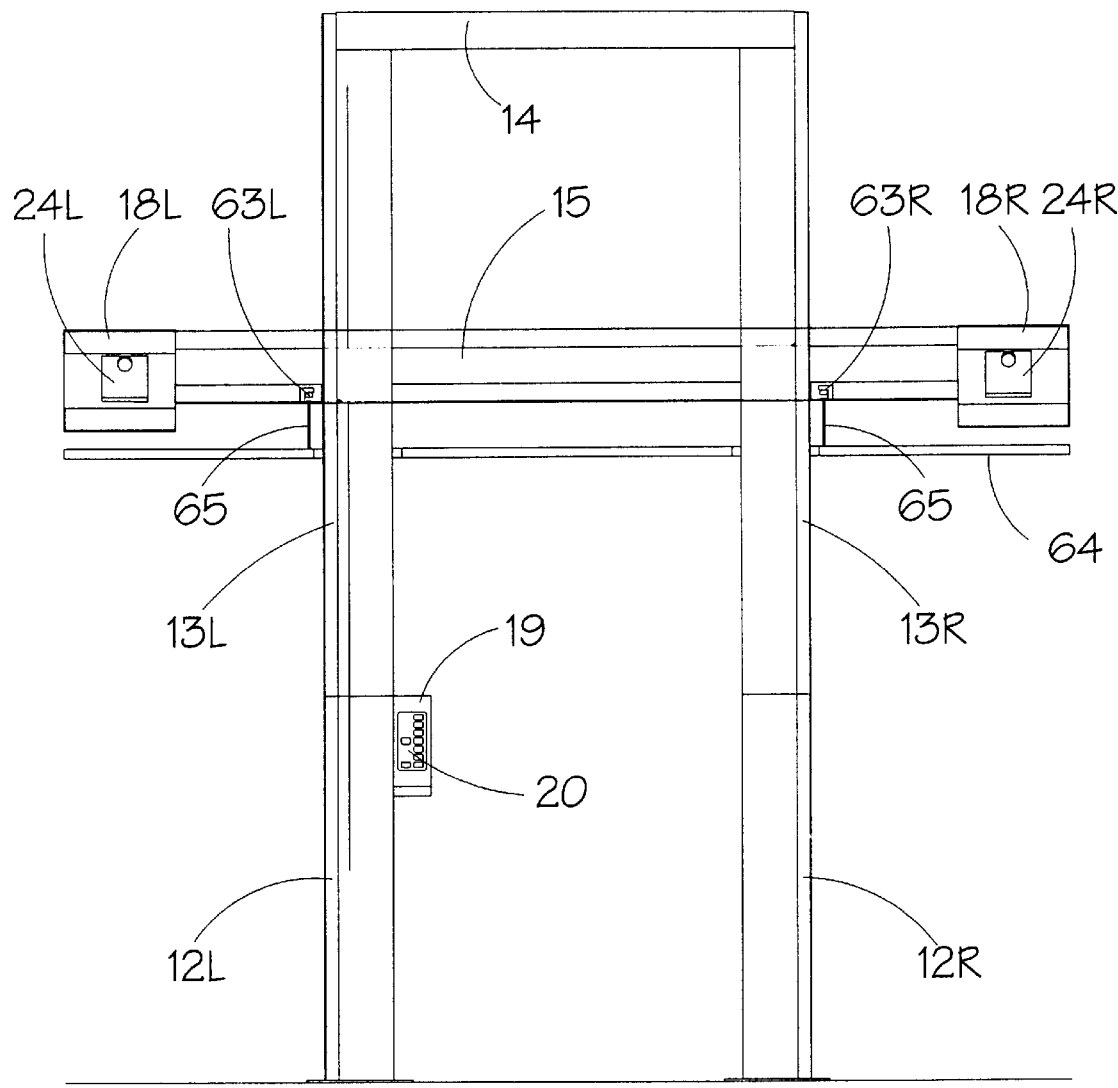
FIG. 12 shows a front view of the camera positioning system and illustrates the safety mechanism. corresponding reference numerals indicate corresponding parts throughout the several figures of the drawings.

FIG. 12 shows a front view of the camera positioning mechanism with the horizontal beam outer cover 17 removed and the main shell 21 shown transparently. This allows the safety switches 63L and 63R to be seen, as well as the supporting bolts 65 for the safety bar 64. The bolts 65 pass through holes in the bottom of the main shell 17 and screw into the safety bar 64, thereby allowing the safety bar 64 to hang a few inches below the horizontal beam 15. If the safety bar 64 is pushed up slightly, at least one of its supporting bolts 65 will be pushed up through its hole in the bottom of the main shell 17 and so trip at least one of the two safety switches 63L or 63R. These safety switches 63L and 63R are normally closed and are wired in series, such that, if either opens, the safety system "trips". The intention here is to protect the safety of anyone or anything which is below the horizontal beam 15 as it is lowered. If either safety switch 63L or 63R is tripped, the motor 39 is prevented from running because the safety switches 63L and 63R interrupt the current to the coil of the relay which powers the motor 39, and a logic input is provided to the micro-controller so the logic therein can sense that the safety mechanism has tripped.

Referring to FIG. 10, if the user presses and holds the "up" key 49, the controller 60 actuates the relays to energize the motor 39 and cause the horizontal beam 15 to move upwards. This upward motion continues until the user releases the "up" key 49 or the upper limit switch 47U trips, whichever happens first. Similarly, if the user presses and holds the "down" key 55, the controller 60 actuates the relays to energize the motor 39 to cause the horizontal beam 15 to move downwards. This downward motion continues until the user releases the "down" key 55 or the lower limit switch 47L trips, whichever happens first. The user is thus able to move the horizontal beam 15, and thus the cameras 24L and 24R, to any desired position within the range of their allowed positions simply by using the "up" key 49 and/or the "down" key 55. The positioning of the cameras is easier to control than if a garage door opener is used, as the user is able to move the cameras directly from one position to another position, without having to insure that the cameras are moving "up" when the movement is stopped, or to start moving one direction and then reverse directions.

In an alternate embodiment of the keypad 20, such as a slide potentiometer, rotary potentiometer, or the like, or an equivalent graphical display, the user can identify a desired position for the cameras by moving the slide potentiometer, rotary potentiometer, or the like, or by selecting a point on the graphical display or scale. The controller 60 then actuates the relays to energize the motor 39 to cause the cameras to move towards the identified position. This movement continues until the cameras reach the desired position or a limit switch 47U or 47L trips, whichever happens first.

Even greater ease of control is achieved by using "preset" keys 50, 51, 52, 53, and 54. Use of these keys is quite simple. The user would "preset" any one of these keys, for example key 52, by using the "up" key 49 and/or the "down" key 55 to move the cameras to a desired position, after which the user would press and hold the "M" (memory) key 56, then press the preset key 52, and then release both keys. The controller 60 would then store or "remember" the current position of the horizontal beam 15, as measured by the potentiometer 48, and it would associate the remembered position with the preset key 52. At any time later, the user can cause the controller to return the horizontal beam 15 to the remembered position associated with preset key 52 simply by pressing and releasing the preset key 52. Since the controller is able to measure the current horizontal beam 15 position at any time using the potentiometer 48, it is able to move the horizontal beam 15 the correct direction and stop the motion when the horizontal beam 15 position matches the remembered position within allowed tolerances.

Note that the concept of "moving the horizontal beam" is used interchangeably with the term "moving the cameras", as the cameras are mounted within the beam. Even more generally, the concept of the "position of the cameras" does not mean that multiple cameras occupy the same position, rather, since the relationship between the cameras is held as constant as possible by the structure to which they are mounted, it means that the cameras as a group are moved to a position. Note that it is not necessary with such a system to move the cameras precisely or exactly back to a stored position, rather the term "moving the cameras to a stored position" means "moving the cameras to within allowed tolerances of the stored position". These allowed tolerances might be a few millimeters, a few inches, or even half a foot or so. The size of the tolerances are not critical to the invention.

It is a convenient aspect of such a camera positioning system that no calibration of it is required, in that the positioning system does not have to understand that a particular output of the potentiometer 48 means a particular position of anything in units such as inches. Rather the system only has to store or remember the output of the potentiometer 48 as a value that is measured when the beam, and thus the cameras, are returned to a stored or remembered position. However, an embodiment in which a slide potentiometer or other device is used to directly indicate a desired position for the cameras, calibration might be required so a position indicated by the user can be understood by the controller.

All five preset keys 50, 51, 52, 53, and 54 can be "preset". For example, preset key 54 could be preset to a position for use when the vehicle lift rack 35 is "all the way down", preset key 53 could be preset to a position for use when the vehicle lift rack 35 is at "normal alignment height", preset key 52 could be preset to a position for use when the vehicle lift rack 35 is at an "adjustment height" which is higher than "normal alignment height", preset key 51 could be preset to a position for use when the vehicle lift rack 35 is at a second "adjustment height" which is higher still than the position associated with preset key 52, and preset key 50 could be preset to a position for use when the vehicle lift rack 35 is "all the way up". Note that this is only one set of positions that could be associated with the preset keys. Any preset key can be associated with any possible position, and the preset positions need not be in any particular order relative to the positions of the preset keys on the keypad 20.

The great utility of controlling the position of the camera by using "preset" keys is readily apparent. To illustrate this, consider an example vehicle alignment measurement and adjustment scenario. The technician would begin by driving the vehicle onto the vehicle lift rack, placing the transmission in neutral, stopping the engine, and chocking the wheels. The technician would then raise the vehicle lift rack to "normal alignment height", after which the optical targets would be mounted to the vehicle wheels. Once the optical targets are mounted to the wheels, the technician would perform a "compensation" procedure to determine the relationship between each optical target and the axis of rotation of the wheel to which that target is mounted. All this so far is well known in the art.

Since the compensation procedure involves measuring the orientation of the targets using the images produced by the cameras, the cameras must be in a position suitable for viewing the targets. The technician would insure this is possible by pressing the preset key 53, which would already have been preset to the "normal alignment height" position, thereby causing the controller to move the horizontal beam to the preset position associated with "normal alignment height", in which position the cameras would be able to view the targets. Note that the cameras can be positioned in anticipation of performing the compensation procedure at any time before the procedure begins, perhaps even at the end of the previous alignment job. Since the user has only to press and release the preset key 53 and walk away to perform other tasks, and since the user does not have to wait for the cameras to move to the correct position and then stop the movement via a pushbutton, the technician's work is more efficient and productive. Even better, skill in positioning the cameras in a certain location is required only during the process of setting the "preset" positions, but not later during normal use. As the alignment job progresses, the technician might have to perform an adjustment while under the vehicle. Accordingly, the technician would press and release the preset key 50, 51, 52, 53, or 54 that is associated with the desired adjustment height of the vehicle lift rack, then move the vehicle lift rack to that adjustment height. The cameras would then move to the correct position for viewing the targets with the vehicle lift rack in the new position, and the cameras would likely be in the correct position before the vehicle lift rack is. This use of "presets" constitutes an inventive aspect of the camera positioning system.

Safety considerations are important with such a camera positioning system. A safety bar 65 with associated safety switches 63L and 63R are provided to prevent the horizontal beam being lowered onto anyone or anything. If the motor 39 is energized and either safety switch 63L or 63R is tripped, current to the relay which energizes the motor 39 is interrupted, thereby opening the relay, which stops the motor and the movement of the horizontal beam 15. Further, the controller 60 senses the tripping of the safety switches and turns off its drive of the relays, thereby further insuring the motor 39 is stopped. As further safety measures, the motor is turned off and any "positioning" operation in progress ceases if two keys of the keypad are pressed at once, and any movement to a "preset" position stops if the "R" key 57 is pressed. Finally, a "preset" key is ignored if, as in a new installation, no preset position has yet been associated with a particular "preset" key. This "new" condition can be restored by simply pressing and holding both the "M" key 56 and the "R" key 57 simultaneously for about five seconds.

A beeper is provided in the controller 60 to provide audible feedback. The beeper beeps at a slow, continuous rate when the motor is energized, much as beepers are used with trucks and other vehicles when they are in reverse gear, and stops when the motor is de-energized. If the motor is stopped by the safety bar 65, the beeper beeps continuously at a faster rate, and remains so until the "R" (reset) key 57 is pressed. Further, in this case the entire keypad is disabled and other operations are inhibited until the "R" key 57 is pressed. When a "preset" position is remembered in association with a preset key, as explained above, the beeper beeps three times very quickly as audible feedback that the presetting operation was successful.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An apparatus for controlling camera position in a wheel alignment system having a plurality of optical targets, each of said plurality of optical targets configured for mounting to a wheel of a vehicle, at least one video camera configured for viewing the optical targets and for producing at least one image thereof, and a computer system configured to receive the at least one image and to measure the at least one image to compute vehicle wheel alignment information, said apparatus comprising;

a positioning system for positioning said at least one video camera to view said optical targets and to produce said at least one image of said targets; and a controller for controlling said positioning system, said controller configured to direct said positioning system to position said at least one video camera in at least one desired position, said controller configured to store said at least one desired position of said at least one video camera, and said controller further configured to recall said stored position and direct said positioning system to position said at least one video camera at said stored position.

2. A method for controlling camera position in a wheel alignment system having optical targets mounted to the wheels of a vehicle, at least one camera configured for viewing said optical targets and producing at least one image thereof, a computer system configured for measuring said at least one image and for using said measurements to compute vehicle wheel alignment information, and a positioning system configured for positioning said at least one camera to produce said at least one image of said targets, said method comprising the steps of:

positioning said at least one camera in at least one desired position;

storing said at least one desired positioning in a controller; and subsequently recalling said stored position and repositioning said at least one camera at said stored position.

3. A method for controlling camera position in a wheel alignment system having optical targets mounted to the wheels of a vehicle, at least one video camera configured for viewing said optical targets and producing at least one image thereof, a computer system configured for measuring said at least one image and for using said measurements to compute vehicle wheel alignment information, and a positioning system configured for positioning said at least one video camera to produce said at least one image of said targets, said method comprising the steps of:

identifying a desired position for said at least one video camera; and controlling said positioning system to move said at least one video camera to said identified position.

4. An apparatus for controlling camera position in a wheel alignment system having optical targets for mounting to the wheels of a vehicle, at least one video camera for viewing said optical targets and producing at least one image thereof, a computer system for measuring said at least one image and for using said measurements to compute vehicle wheel alignment information, and a positioning system for positioning said at least one video camera to view said optical targets and to produce said at least one image of said targets, said apparatus comprising:

a controller responsive to user input indicating a desired position for said at least one video camera, said controller further responsive to said user input to control said positioning system to move said at least one video camera to said desired position.

5. An improved vehicle wheel alignment system having a plurality of optical targets each adapted for mounting to a vehicle wheel, at least one camera configured to obtain images of said plurality of optical targets, a positioning system configured to move said at least one camera, and an alignment console including a central processor configured to receive images from said at least one camera and to determine vehicle wheel alignment angles therefrom, said improvement comprising:

a controller operatively connected to said positioning system, said controller configured to receive operator input and to control movement of said at least one camera through said positioning system, and wherein said controller is further configured to access a memory adapted to store at least one representation of a predetermined camera position.

6. The improved vehicle wheel alignment system of claim 5 wherein said controller is further configured to receive operator input directing said controller to recall said representation of a predetermined camera position from said memory; and wherein said controller is configured to control movement of said at least one camera to said predetermined camera position through said positioning system.

7. The improved vehicle wheel alignment system of claim 5 wherein said positioning system is configured to generate an representation of a camera position, and wherein said controller is configured to store said representation of a camera position in said memory in response to received operator input.

8. The improved vehicle wheel alignment system of claim 7 wherein said representation of a camera position corresponds to a current position of said camera.

9. The improved vehicle wheel alignment system of claim 7 wherein said positioning system includes a position sensor, an output of said position sensor related to said camera position.

10. The improved vehicle wheel alignment system of claim 9 wherein said position sensor comprises one of a set of a potentiometer, a shaft encoder, an LVDT, and a Hall-effect device.

11. A method for controlling a camera position in a wheel alignment system having optical targets mounted to the wheels of a vehicle, at least one camera configured for viewing said optical targets and producing at least one image thereof, a computer system configured for receiving and measuring said at least one image and for using said measurements to compute vehicle wheel alignment information, and a positioning system configured to position said at least one camera to produce said at least one image of said targets, said method comprising the steps of:

directing said positioning system to move said at least one camera to a desired position;

generating a signal representative of said camera position;

responsive to said camera attaining said desired position, recording said signal representative of said camera position;

subsequently recalling said recorded signal representative of said camera position; and utilizing said recalled signal to direct said positioning system to return said at least one camera to said desired position.

12. The method of claim 11 for controlling a camera position further including the step of associating said recorded signal representative of said camera position with an input device, wherein actuation of said input device initiates said steps of recalling said recorded signal and utilizing said recalled signal.

* * * * *